United States Patent Office 3,327,724
Patented June 27, 1967

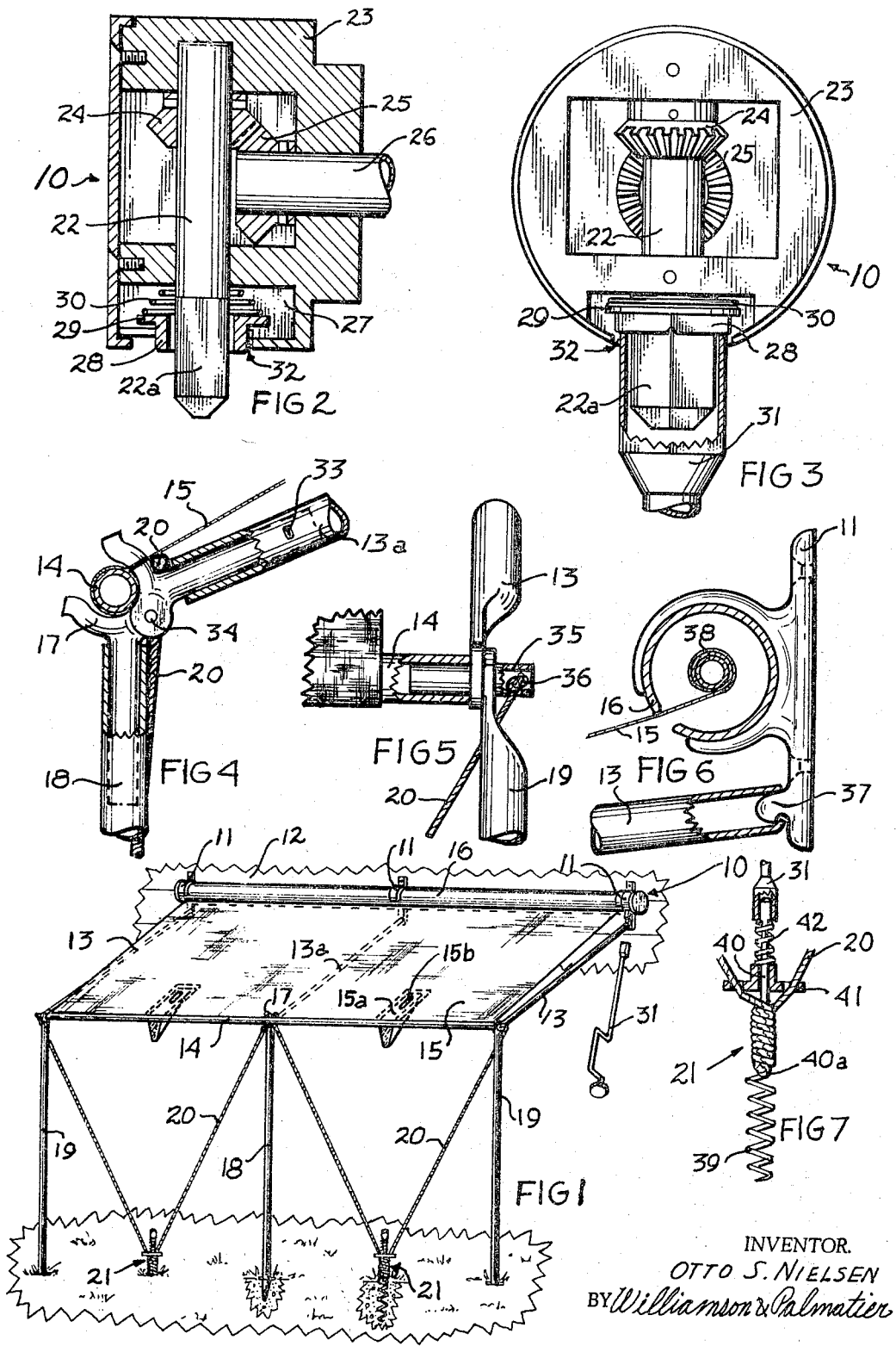

3,327,724
RETRACTABLE PROTECTIVE COVERING
Otto S. Nielsen, 4875 Sorell Ave. N.,
Minneapolis, Minn. 55422
Filed Oct. 6, 1965, Ser. No. 493,343
6 Claims. (Cl. 135—5)

This invention relates to a retractable protective covering, and more particularly relates to a retractable protective covering adapted for use on, for example, trailers, automobiles and houses.

It is oftentimes desirable to have a readily available protective covering over a patio or alongside a trailer when camping out. It is particularly convenient to have a covering which is quickly assembled, yet sturdy enough to withstand wind and rain. A camper, with a house trailer, is always in need of additional space outside of his trailer, yet has a minimum of room to store, within the trailer, means for providing the additional space outside of the trailer.

A home owner, having a patio, may wish to use the patio at selected times of the day without a protective covering, and at other times with a protective covering. Consequently, a protective covering which may be either quickly assembled or quickly disassembled is very desirable to the home owner. Additionally, ease in storing the protective covering is particularly desirable to the home owner who may regularly alternate use and nonuse of the covering.

Retractable protective coverings have been known in the past, but the known protective coverings have been unduly complicated and difficult to assembly to the extent that they have not been practical for use on house trailers, patios or on truck beds.

With these comments in mind it is to the elimination of these and other disadvantages to which the present invention is directed along with the inclusion therein of other novel and desirable features.

An object of my invention is to provide a new and improved retractable protective covering of simple and inexpensive construction and operation.

Another object of my invention is the provision of a retractable protective covering complete with covering storage enclosure and means for anchoring the protective covering when in use.

Still another object of my invention is the provision of improved supporting and holding means for the protective covering when in use.

Still another object of my invention is the provision for a means for tightening and securing the covering when in use, and locking the protective covering in the tightened position.

These and other objects and advantages of my invention will more fully appear from the following description made in connection with the accompanying drawings wherein like reference characters refer to the same or similar parts throughout the several views, and in which:

FIG. 1 is a perspective view showing a typical use and arrangement of my retractable protective covering.

FIG. 2 is a side elevation section view of the reel tightening and locking device.

FIG. 3 is a front elevation section view of the tightening and locking device of my invention.

FIG. 4 is a partial side elevation, partially shown in cross-section, of the protective covering support assembly.

FIG. 5 is a partial front view of the leading edge end supports of the covering.

FIG. 6 is a side view showing the frame and strut mounting bracket.

FIG. 7 shows the ground engaging tightener of my invention.

One form of the present invention is shown in the drawings and is described herein. FIG. 1 shows the protective covering of my invention completely assembled. The covering tightening and locking device is indicated in general by numeral 10. The covering frame mounting bracket and strut connection is indicated in general by numeral 11, and is shown attached to a home 12. Covering struts 13 are shown extending from brackets 11 at each end of the protective covering assembly. A middle covering strut 13a is also shown. End covering struts 13 are shown extending from bracket 11 to the covering leading edge tube 14. The protective covering 15 is typically a nylon mesh coated with a vinyl plastic and may include a gusset 15a to drain water away from the covering. The protective covering 15, even though tautly drawn between leading 14 and wall 12, will be urged downwardly under the weight of rainwater between leading edge 14 and wall 12. When this happens, rainwater is not free to drain from the protective covering in that puddles are formed depressing the covering below the leading edge 14. Gussets 15a are thereby provided and communicate wih slots 15b in the protective covering. Gussets 15a may then direct water which would accumulate in the depressed areas between the wall and the leading edge outwardly away from the depressions and below the higher leading edge. The covering 15 is attached on one end to a reel which is secured to a frame 16 and attached on the other end to leading edge tube 14. This covering is mold, mildew and rot resistant and consequently may be stored in the frame even when wet. A typical patio protective covering would extend outwardly from house 12 approximately 9′0″ to 12′0″, and would have a width of from 8′0″ to 16′0″, depending upon the area which the user wishes to protect.

Middle pusher assembly 17 forces leading edge tube 14 outwardly from house 12, and cooperates with strut 13a. Middle upright support 18, typically aluminum or steel tubing, also co-operates with pusher arms 17. Side upright supports 19, which may be constructed of aluminum or steel tubing, are connected to leading edge tube 14 to support protective covering 15 at the desired height. Rope 20 is shown connecting the leading edge tube 14 with ground engaging pegs 21 which give stability to the protective covering when in use.

The tightening and locking device of my invention is shown in detail in FIG. 2 and FIG. 3. A manually operated drive shaft 22 is shown mounted in frame 23 for rotational movement therein. The shaft 22 is typically formed from cold rolled steel, or in some instances may be fabricated from a high strength plastic. The housing 23 may be either a cast metallic housing or even a plastic housing. Drive shaft 22 has, at one end, a generally square cross-section portion 22a adapted to receive a manually operated crank for imparting rotation to shaft 22. Gear 24 is mounted on shaft 22 and is typically constructed of nylon. Gear 24 meshes with gear 25 which interconnects shaft 22 with reel shaft 26, which is mounted in housing 23 and is connected to a reel for protective covering 15. Manual rotation of shaft 22 is imparted to reel shaft 26 through gears 24 and 25 to retract covering 15 as desired. A locking device is provided to secure covering 15 in the desired retracted, taut position.

The covering locking device of my invention is shown in FIG. 2 in the locked position. A cavity 27 is provided in gear box frame 23 at the outlet of shaft 22, adjacent the portion 22a of shaft 22 adapted to receive a manually operated crank. A collar 28, typically formed from aluminum or possibly plastic, is slidably mounted on shaft 22 along the square cross-sectional portion thereof. Collar 28 has an internal cross-section of substantially the same configuration as the cross-section of drive end of shaft 22.

Collar 28 has an outer cross-sectional configuration also substantially the same as the configuration of the cross-section of the drive end of shaft 22. A shoulder 29 forms an integral part of collar 28 and is disposed in cavity 27. Spring 30 encircles shaft 22 and may be compressed within cavity 27 by the action of shoulder 29 against spring 30. Spring 30 is typically formed of tempered steel and is concentric, allowing each succeeding ring to compress within the former ring, thereby conserving space within cavity 27.

FIG. 3 shows the tightening and locking device 10 in the release position, for retracting the protective covering. A manually operated crank 31 is shown driving shaft 22, and compressing spring 30. Collar 28 is disposed within frame 23 and clears the opening in frame 23, indicated in general by numeral 32. Since collar 28 has a generally square outer cross-sectional configuration, and the opening 32 corresponds with the square cross-sectional dimensions of collar 28, the collar may only be fitted into opening 32 in a position engaging the side edges of collar 28 with frame 23 at opening 32. This prevents further rotation of shaft 22, since spring 30 assumes the position shown in FIG. 2, after manually operated crank 31 is removed from shaft 22.

FIG. 4 shows middle bracket 17 slidably mounted in middle upright 18 and strut 18a. Since upright 18 and strut 13a are constructed from tubular material, bracket 17, which may be a cast part, may be slidably fitted into each member. In one embodiment of my invention, strut 13a may be affixed to bracket 17 by simply staking strut 13a, as indicated at 33. A hinge 34 is provided in bracket 17 to provide ease in assembling the protective covering. Rope 20 is shown overlapping bracket 17 in the assembled position.

The assembly of end struts 13 and end uprights 19 to leading edge tube 14 is shown in FIG. 5. Struts 13 have an aperture at the end adjacent the leading edge tube. Uprights 19 have an aperture at the upper end thereof adjacent leading edge tube 14 and are adapted to be placed in overlapping relation to the apertures in struts 13. A pin 35 is inserted through the apertures in struts 13 and uprights 19, into the longitudinal opening in tube 14. Pin 35 is typically steel tubing having an outer diameter adapted to be slidably inserted into the inner diameter of tube 14. Rope 20 is inserted through a transverse opening in pin 35 and simply knotted as indicated at 36. As rope 20 is tightened, a force is applied to pin 35 holding the pin engaged in the longitudinal aperture of tube 14 and binding strut 13 and uprights 19 in the desired position.

Flange 11, as shown in FIG. 6, includes an adapter 37 adapted to receive struts 13 and 13a. Frame 16 is shown enclosing protective covering 15 which is shown wound on a reel 38, which reel is connected to shafts 26 for manual rotation.

The ground engaging and tightening device of my invention is shown in FIG. 7 and includes a screw portion 39 which is constructed of a rigid material such as steel wire formed in a spiral configuration. Screw portion 39 is connected to a rigid rod 40 which has, at its upper end, a fitting adapted to receive a manually operated crank. Rope 20 is threaded through washer 41, around upright stem 40, through the other side of washer 41 and over bracket 17 to be secured at pins 35 at each end of leading edge tube 14. Washer 41 is spring loaded, to provide flexibility in tightening rope 20. As crank 31 rotates stem 40, screw portion 39 is imbedded into the ground and washer 41 forces rope 20 to wind itself about stem 40, additionally tightening the rope. Washer 41 also prevents rope 20 from interfering with the tightening operation. The spring 42 facilitates the positioning of washer 41 in contact with rope 20.

In operation, flanges 11 are attached to an upright wall. This wall may be that of a home, house trailer or even a car. Frame 16 is slidably mounted in brackets 11, positioned so that protective covering 15 may be reeled outwardly therefrom. Upright supports 18 and 19 are disposed outwardly from the upright wall and inserted into tht ground. Struts 13 and 13a are placed on adapter 37 of bracket 11. The covering may then be pulled outwardly from the reel to the desired distance from the upright wall and into position near the upright supports 18 and 19 and ends of struts 13 and 13a for assembly thereto. Bracket 17 is placed to maintain leading edge tube 14 outwardly from reel 38. Pins 35 are inserted through the apertures in ends struts 13 and uprights 19 joining these members to leading edge tube 14, at each end of covering 15. Rope 20 is then placed in overlapping relation to bracket 17, and ground engaging member 21 are secured in the ground. At this point the struts 13 and 13a and uprights 18 and 19, as well as the rope 20 are substantially secure. It is important, however, to additionally secure covering 15 and make it taut to provide adequate roll-off in rain storms. It is also desirable to place some additional stress on struts 13, to provide additional rigidity to the structure. In some instances, mosquito netting or upright tent wall sides may be affixed to struts 13, and it is therefore important that this additional rigidity be available. This is provided by manually rotating shaft 22 and transmitting this rotation through shaft 26 to reel 38. The covering 15 is then tightened the desired amount using manually operated crank 31. When crank 31 is removed from locking device 10, the spring loaded locking assembly goes back into locking engagement with the frame 23. This prevents covering 15 from reeling outwardly into a less taut position.

The protective covering may be disassembled by simply operating the gear assembly 10, releasing covering 15 from its tightened position. Next, ground engaging screws 21 are loosened using manual crank 31. Pins 35 are removed from leading edge tube 14 releasing upright 19. Pusher brackets 17 is removed from upright 18 and struts 13 and 13a may be removed from flange bracket 11. Covering 15 may now be rolled into frame 16 utilizing gear assembly 10 and crank 31. When covering 15 is completely reeled into the frame, it is locked in this position by the removal of crank 31 from shaft 22 and frame 23.

It will, of course, be understood that various changes may be made in the form, details, arrangement and proportions of the various parts without departing from the scope of my invention.

What is claimed is:

1. A retractable protective covering adapted for attachment to a wall member, such as an upright wall or a ceiling, comprising, a frame adapted to be attached to a wall member, a reel mounted in said frame for rotational movement therein, a protective covering having a leading edge and attached to said reel along the edge opposite the leading edge, supporting struts attached to the wall and positioned generally normal to the leading edge of said covering, upright supports adapted to engage the ground and the leading edge of said protective covering and thereby support the leading edge of said protective covering a predetermined distance above the ground, a flexible hold down member attached to the leading edge of said covering and to the ground whereby the leading edge is urged toward the ground tightly securing the leading edge on said upright supports thereby maintaining and securing the leading edge away from the ground and a reel tightening and locking device connected to said reel, said reel tightening and locking device adapted to reel said protective covering inwardly thereby tautly drawing said covering and urging the leading edge thereof against said supporting struts and lock said protective covering in the taut position whereby said retractable protective covering forms a rigid structure.

2. The retractable protective covering of claim 1 including a leading edge tube attached to the leading edge of said protective covering, the upright supports affixed to each end of said leading edge tube, and
   a pin mechanism releasably connecting said upright supports and said substantially horizontal struts to each end of said leading edge tube.

3. A retractable protective covering adapted for attachment to a wall member, such as an upright wall or a ceiling, comprising in combination,
   a frame adapted to be attached to a wall member,
   a reel mounted in said frame for rotational movement therein,
   a reel tightening and locking device interconnected with said reel, said tightening and locking device including a frame, a shaft rotatively mounted in said frame and adapted to receive a manually operated crank, said shaft including a gear affixed thereon, a second shaft rotatively mounted in the frame and having a gear affixed thereto in meshing relation with the gear affixed to the first mentioned shaft, the second shaft attached to said reel, and a crank operated drive having a spring loaded locking element slidably mounted on the first mentioned shaft engageable with the gear box frame in the normal locking position and under compression in the release position for rotation of said reel,
   a protective covering having one end thereof attached to said reel and the other end thereof attached to a leading edge tube, the protective covering in the protracted position supported by upright supports and substantially horizontal supporting struts general normal to the leading edge and joined to each end of the leading edge tube by a pin inserted through an aperture in the ends of each of the strut and upright members, the pin projecting into the longitudinal aperture in the leading edge tube, and held in engaging relation by rope tension binding the pin against said strut and upright members,
   a middle strut and upright support assembly including a pusher bracket adapted to maintain the leading edge tube a predetermined distance from a wall member, the pusher bracket slidably mounted in the longitudinal aperture in a middle upright support, and
   a flexible securing element attached to the pins joining said end uprights and strut members, secured to the ground and contacting the pusher bracket and maintaining a downward force thereon.

4. The retractable protective covering of claim 8 including an adjustable ground engaging peg adapted to be attached to said flexible member whereby said flexible member may be adjustably tightened with a manually operated crank to the desired tension of said flexible member.

5. The retractable protective covering of claim 3 in which said protective covering includes means attaching vertically disposed protective covering depending therefrom.

6. The retractable protective covering set forth in claim 3 wherein said protective covering includes means receiving an accumulation of water on said protective covering, and directing said water outwardly away from the leading edge of said protective covering.

References Cited
UNITED STATES PATENTS

| | | | |
|---|---|---|---|
| 1,400,445 | 12/1921 | Lofquist | 135—15 |
| 2,752,992 | 7/1956 | D'Azzo | 160—46 |
| 2,788,791 | 4/1957 | Pospisil | 135—5 |
| 2,789,263 | 4/1957 | Cohn | 160—45 |
| 2,808,065 | 10/1957 | Ellis | 135—5 |
| 2,989,339 | 6/1961 | Southall | 160—368 |

REINALDO P. MACHADO, *Primary Examiner.*